Patented Sept. 26, 1939

2,173,845

UNITED STATES PATENT OFFICE 2,173,845

METHOD OF PRODUCING CRYSTALLINE BASIC PHENYL MERCURY NITRATE

Josef Kathol, Berlin, Germany, assignor to Schering-Kahlbaum A. G., Berlin, Germany, a corporation of Germany No Drawing. Application March 1, 1935, Serial No. 8,848. In Germany March 6, 1934

5 Claims. (Cl. 260—433)

It is the general object of the invention to produce the isolated nitrates of mercurized benzene in substantially pure condition and to obtain products of substantially constant composition and melting point.

In the literature a number of methods of formation of a so-called nitrate of the formula $C_6H_5.Hg.ONO_2$ has been described (see Beilstein, Handbuch der organischen Chemie, 4, Aufl., Band 16, S. 953). With regard to its melting point there are considerable divergencies between the data of the different authors. Bamberger (Berichte der deutschen chemischen Gesellschaft, Bd. 30, S. 510), for instance, found a very ill-defined melting point between 176 and 186° C., whilst Otto (Journ. f. prakt. Chemie 2, Bd. 1, S. 181) quotes 165–168° C.

I have discovered that the hydroxy mercury benzene forms two different well-defined nitrates, i. e., a neutral nitrate of the formula

of the melting point about 131° C. and a basic nitrate of the formula $(C_6H_5)_2Hg_2(ONO_2)(OH)$ of the melting point 185–186° C. Whether this basic nitrate is a double compound of the two substances $C_6H_5HgONO_2$ and $C_6H_5HgOH$, or a molecular combination, or other chemical unity, cannot be determined. However, the evidence points to its being a single chemical entity and not a mixture, for the composition of the substance as a whole and the stoichiometric relationship between the phenyl mercuric nitrate and the phenyl mercuric hydroxide are constant. The nitrates described in the literature are to be considered mixtures of both nitrates in various proportions, it being an open question whether they are simply mechanical mixtures or mixed crystals.

According to the present invention the well-defined nitrates of the hydroxy mercury benzene mentioned can be produced from known mixtures and converted into each other in the following manner. If, for instance, a mixture obtained in the usual way is dissolved in boiling dilute (aqueous) nitric acid, the basic nitrate crystallises in a pure condition on cooling and hence, surprising to say, the basic salt is formed although one would rather expect the formation of the neutral salt on account of the repression of the hydrolysis by reason of the presence of excessive nitric acid. This is probably to be attributed to the fact that the neutral nitrate shows a very strong tendency to hydrolysis, corresponding to the equation:

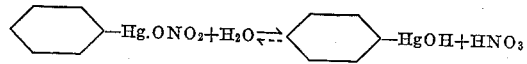

The phenyl mercury hydroxide formed thereby as well as the neutral phenyl mercury nitrate are capable of forming a relatively stable molecular compound in the ratio of 1:1; said compound being comparatively more difficult to dissolve not only in water but also in many organic solvents than any one of the two compounds. Hence, a proportionately insignificant hydrolysis of the neutral nitrate leads to an overstepping of the solubility product of the molecular compound.

Thus, in order to obtain the pure neutral nitrate of the formula $C_6H_5.Hg.ONO_2$, every possibility of hydrolysis is to be avoided. If, for instance, one did proceed according to the process described by R. Otto (Journ. f. prakt. Chemie [2], Bd. 1, S. 181), alcohol would have to be used that was entirely free from water instead of alcohol containing water as used by Otto.

Furthermore another method was discovered for obtaining this product, said method consisting in extracting with organic solvents aqueous solutions or suspensions of the basic nitrate containing an excess of nitric acid. Especially suitable are such solvents as possess, besides limited miscibility with water, on the one hand a strong power of dissolving the neutral nitrate and on the other hand a least possible power of dissolving the basic nitrate and the free base. It has been found that water-immiscible organic solvents, such as acetic acid ethyl ester, ether and the like, meet these requirements. During the extraction the neutral nitrate, being always present in the aqueous nitric acid solution in the state of equilibrium of hydrolysis, readily passes into the organic solvent. On account of the disturbance of the equilibrium caused thereby, the aqueous solution dissolves further quantities of undissolved basic nitrate which are immediately taken up by the organic solvent after their conversion into the neutral nitrate. Few extractions suffice to free the aqueous solution quantitatively from the mercury compound. On concentration by evaporation of the acetic acid ethyl ester or the ether solution, which is preferably carried out in a vacuum at a low temperature, the neutral nitrate crystallises out.

There have already been produced a number of alkyl mercury nitrates by Slotta and Jacobi (Journ. für prakt. Chemie, Neue Folge, Bd. 120, 1928/29, S. 271 ff.) by neutralisation of the free bases with nitric acid. In these cases the bases were treated with nitric acid in methyl alcohol solution and the oils obtained after the evaporation of the solutions, were mixed with water, whereby crystalline compounds were obtained which upon standing in the air partly deliquesced. Apart from the fact that no details are given in this publication with regard to the production and properties of the compounds obtained according to this invention, the technical rule given by the latter can in no way be deduced from this literature reference, namely that the production of definite nitrates of the mercurised benzene is only possible when the isolation of these salts from their solutions is effected in a very definite manner.

A further essential characteristic of the present invention is to be seen in the fact that it is no longer necessary to first isolate the nitrate mixtures described in the literature in order to transform them subsequently into one of the two pure nitrates; on the contrary, the knowledge of the conditions of existence of the crystalline pure nitrates discovered by the applicant makes it possible to consciously determine the conditions during the manufacture of said compounds so as to isolate the desired pure nitrate.

Finally the invention provides means whereby the two pure nitrates can be alternately converted one into the other, a feature which may be made use of which advantage as occasion requires.

It will thus be seen that the character of the product can be readily predetermined by regulating the hydroxyl ion concentration in the medium in which the phenyl mercury nitrate is suspended or the solvent in which the reaction resulting in its formation takes place, a zero or substantially zero hydrozyl ion concentration resulting in the formation of the neutral nitrate, while a considerable concentration of hydrozyl ions produces the basic nitrate even in the presence of free acid.

The compounds obtained are to be used in therapy, as fungicides and insecticides, as disinfectants and for other like purposes.

The following examples serve to illustrate the invention without, however, limiting the same to them:

EXAMPLE 1

A cold saturated solution of phenyl mercury acetate (1 part in about 200 parts of water) the mercury compound being made, for instance, according to the process of the DRP 553 280, is mixed with a cold saturated solution of sodium nitrate until precipitation ceases on further addition of the latter. After adding a small quantity of dilute nitric acid the reaction liquid is heated to the boiling point. On cooling the basic nitrate crystallises out from the aqueous medium in small colorless flakes with a slight luster like mother-of-pearl. If necessary, the already very pure product can be recrystallised from water containing nitric acid. The melting point of the recrystallised material will be found at 185–186° C. (with decomposition) in an apparatus previously heated to 180° C. If heated slowly the preparation melts unsharp and at a lower temperature inasmuch as a slow decomposition already sets in at a temperature below the melting point.

Analyses

|  | Percent N | Percent Hg |
|---|---|---|
| Calculated for $C_{12}H_{11}O_4NHg_2$ | 2.21 | 63.25 |
| Found | (I) 2.43 | (I) 63.57 |
|  | (II) 2.48 | (II) 63.78 |

EXAMPLE 2

To convert the basic nitrate to the neutral nitrate, the following procedure may be employed, it being borne in mind that to obtain the neutral nitrate, it is necessary that the solution from which the campound is separated be anhydrous.

25 parts of basic nitrate, produced according to Example 1, are suspended in 200 parts of 25% nitric acid and agitated with 250 parts by volume of acetic acid ethyl ester, whereby the solid substance is gradually dissolved. Thereupon the aqueous layer is extracted, in succession, twice with 100 parts by volume, once with 50 parts by volume and twice with 25 parts by volume of acetic acid ethyl ester, whereby the mercury compound is entirely removed from the aqueous solution. The combined acetic acid ester extracts are vigorously shaken a few times with 20 parts by volume of saturated sodium nitrate solution whereby a large portion of the water taken up by the acetic acid ester solution is given up to the sodium nitrate solution. The acetic acid ester solution is highly concentrated by evaporation in a vacuum (12 mm Hg). Therby a further part of the water dissolved distills off with the acetic acid ester. The last remainder of water is removed in the form of an azeotropic mixture by adding benzine drop by drop during the disillation. The acetic acid ester solution turns yellow during the evaporation and soon an increasing precipitation of fine crystalling needles sets in. Addition of benzine increases the precipitation of crystals. Too high concentration by evaporation is to be avoided as sometimes decomposition sets in. The separated crystals are sucked off by means of a glass filter and are washed with benzine. The crystals are recrystallized from a benzine-benzene mixture (1:4) and dried in the air. By this procedure pure neutral nitrate is obtained in colorless crystalline needles of a melting point 131° C. (with decomposition). Also with this compound the determination of the melting point must be carried out quickly in an apparatus previously heated to about 128° C., as on heating too slowly unsharp low melting points are found on account of gradual decomposition taking place.

Analyses

|  | Percent C | Percent H | Percent N | Percent Hg |
|---|---|---|---|---|
| Calculated for $C_6H_5O_3NHg$ | 21.2 | 1.47 | 4.13 | 59.06 |
| Found | 20.7 | 1.34 | 4.30 | 59.47 |

On recrystallization from water the neutral nitrate is readily reconverted into the basic nitrate of the melting point 185–186° C.

EXAMPLE 3

Phenyl mercury hydroxide or phenyl mercury carbonate is dissolved in an amount of boiling dilute nitric acid corresponding to that which is just required for dissolution. On cooling the basic nitrate corresponding to that of Example 1 crystallizes out.

EXAMPLE 4

Phenyl mercury hydroxide is suspended in 25% nitric acid whereupon the suspension is treated according to Example 2. Thereby the neutral nitrate is produced.

Of course, the given examples serve merely to illustrate the invention; various other modifications and changes in the processes and reagents may be made by those skilled in the art in accordance with the principles set forth herein and in the claims annexed hereto.

What I claim is:

1. A method of producing a crystalline basic nitrate of hydroxy mercury benzene of the general formula $(C_6H_5)_2Hg_2(ONO_2)(OH)$, comprising the step of isolating the same from aqueous nitric acid solutions of crude preparations obtained on producing nitrates of hydroxy mercury benzene.

2. A method of producing a crystalline basic nitrate of hydroxy mercury benzene of the general formula $(C_6H_5)_2Hg_2(ONO_2)(OH)$, comprising the step of dissolving a crude preparation obtained on producing nitrates of hydroxy mercury benzene, in dilute aqueous nitric acid while heating, cooling said nitric acid solution and isolating the precipitate obtained.

3. A method of producing a crystalline basic nitrate of hydroxy mercury benzene of the general formula $(C_6H_5)_2Hg_2(ONO_2)(OH)$, comprising the step of dissolving a crude preparation obtained on producing nitrates of hydrozy mercury benzene, in dilute aqueous nitric acid while heating, cooling said nitric acid solution, isolating the precipitate obtained and recrystallizing the same from water containing nitric acid.

4. A method of producing a crystalline basic nitrate of hydroxy mercury benzene of the general formula $(C_6H_5)_2Hg_2(ONO_2)(OH)$, comprising the step of dissolving a crude preparation obtained on producing nitrates of hydroxy mercury benzene, in water containing nitric acid and allowing the basic nitrate of hydroxy mercury benzene to crystallize.

5. A method of transforming the neutral nitrate of hydroxy mercury benzene of the general formula $C_6H_5.Hg.ONO_2$ into the crystalline basic nitrate of hydroxy mercury benzene of the general formula $(C_6H_5)_2Hg_2(ONO_2)(OH)$, comprising dissolving the neutral nitrate in dilute aqueous nitric acid and allowing the basic nitrate to crystallize from said solution.

JOSEF KATHOL.

CERTIFICATE OF CORRECTION.

Patent No. 2,173,845. September 26, 1939.

JOSEF KATHOL.

It is hereby certified that the name of the assignee in the above numbered patent was erroneously described and specified as "Schering-Kahlbaum A. G.", of Berlin, Germany, a corporation of Germany, whereas said name should have been described and specified as Schering Aktiengesellschaft, a corporation of Germany, as shown by the record of assignments in this office; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.